C. T. WESTLAKE.
SIX WHEEL CAR TRUCK BRAKE.
APPLICATION FILED APR. 21, 1914.
1,107,637.
Patented Aug. 18, 1914.
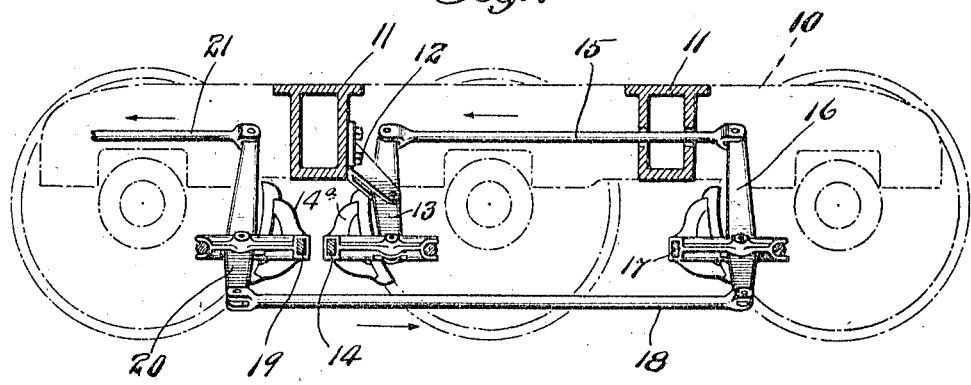
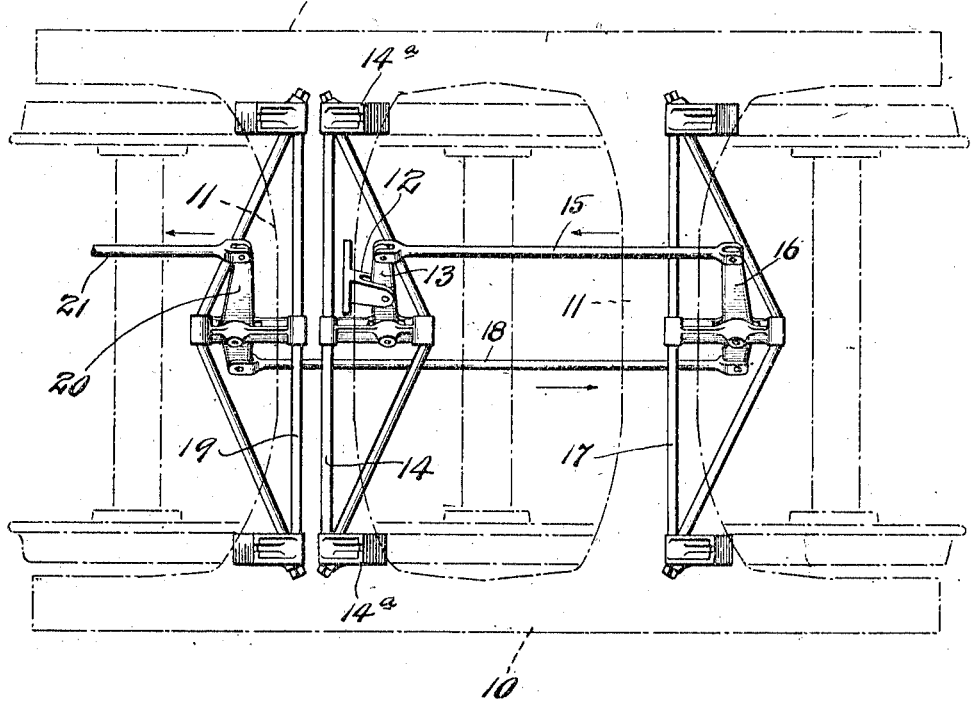
Witnesses:
J. Adolph Bishop
M. P. Smith
Inventor:
Charles T. Westlake,
By F. K. Cornwall,
Atty.

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL-CAR-TRUCK BRAKE.

1,107,637.  Specification of Letters Patent.  Patented Aug. 18, 1914.

Application filed April 21, 1914. Serial No. 833,445.

*To all whom it may concern:*

Be it known that I, CHARLES T. WESTLAKE, a citizen of the United States, residing at the city of St. Louis, State of Missouri, have invented a certain new and useful Improvement in Six-Wheel-Car-Truck Brakes, of which the following is a full, clear, and exact description, such as will enable others skilled in the art to which it appertains to make and use the same, reference being had to the accompanying drawings, forming part of this specification, in which—

Figure 1 is a side elevational view of my improved brake rigging with parts of the brake beams shown in section. Fig. 2 is a plan view of the brake rigging.

My invention relates to new and useful improvements in brake rigging for six wheel car trucks, the principal object of my invention being to provide a simple and efficient brake mechanism having comparatively few parts, and which mechanism is of the inside hung type.

A further object of my invention is to provide a simple form of six wheel brake mechanism, which, while capable of being utilized on various forms of six wheel trucks, is particularly adapted for use in connection with six wheel trucks having frames of the type shown in Patent No. 1,068,529, issued July 29, 1913.

With the above and other objects in view, my invention consists in certain novel features of construction and arrangement of parts, hereinafter more fully described and claimed.

In the drawings I have illustrated in dotted lines a six wheel truck having a one piece frame similar to the frame disclosed in the patent above mentioned, and which frame comprises wheel pieces 10 and transoms 11.

Formed integral with or fixed to one of the transoms is a bracket 12 and pivotally connected thereto is a brake lever 13. The pivot point of this lever is at a suitable point between its ends or extremities, and the lower end of this lever is pivotally connected to a part of the center brake beam 14, preferably the strut thereof. The brake shoes 14ª carried by this center beam are adapted to engage the peripheries of the wheels on the center axle of the truck.

Pivotally connected to the upper end of lever 13 is one end of a compression member 15, preferably a rod, the same extending to a point beyond the transom 11 opposite the one to which the lever 13 is pivotally connected, and pivotally connected to the outer end of said compression member is the upper end of a brake lever 16. This lever 16 is pivotally connected at a point intermediate its ends to a part of a brake beam 17, preferably the strut thereof, and the lower end of said lever 16 is pivotally connected to one end of a compression member 18, preferably a rod. The brake beam 17 is "inside hung", that is, said beam is arranged so that its shoes engage the inner portions of the peripheries of the corresponding wheels.

An inside hung beam 19 is arranged so that its shoes engage the wheels at the opposite end of the truck, and pivotally connected to a part of this brake beam, preferably the strut thereof, is a lever 20. The pivot point of this lever is at a point intermediate its ends, and pivotally connected to the lower end of said lever is the corresponding end of compression member 18. Pivotally connected to the upper end of lever 20 is a tension member 21, preferably a rod which is associated with the brake actuating mechanism on the car body.

The operation of my improved brake will be readily understood from an inspection of the drawings, wherein arrows indicate the direction of movement of the parts 15, 18 and 21 when the latter part is actuated to set the brakes. When rod 21 is moved to set the brakes, the levers 20 and 16 will swing upon their fulcrums, and likewise the lever 13 will be swung upon its fulcrum which is the bracket 12, and simultaneously all the brake beams will be moved so as to bring the brake shoes into frictional engagement with the peripheries of the wheels.

A six wheel brake of my improved construction is composed of but few parts, can be readily assembled and combined with six wheel trucks, particularly those wherein one piece truck frames are utilized, and said brake possesses superior advantages in point of simplicity, durability, and general efficiency.

It will be readily understood that minor changes in the size, form and construction of the various parts of my improved brake can be made and substituted for those herein shown and described, without departing from the spirit of my invention, the scope of which is set forth in the appended claims.

I claim:

1. In a brake for six wheel trucks, a lever having a pivot point between its extremities, a brake beam pivotally connected to one of the extremities of said lever, a compression member pivotally connected at one end to the other extremity of said lever, a second lever which is pivotally connected at one extremity to the other end of said compression member, a second brake beam pivotally connected to the second lever between the extremities thereof, a compression member pivotally connected at one extremity to the other extremity of said second lever, a third lever to which is pivotally connected at one extremity the other end of said last mentioned compression member, a third brake beam pivotally connected to the third lever between its extremities, and means connected to said third lever for actuating the same and the parts coöperating therewith.

2. In a brake for six wheel trucks, a dead lever fulcrumed between its extremities to a convenient part of the truck, a brake beam pivotally connected to one extremity of said dead lever, a compression member pivotally connected at one end to the other extremity of said dead lever, a floating lever to which is pivotally connected at one extremity the other end of said compression member, a second brake beam pivotally connected to said floating lever between the extremities thereof, a compression member pivotally connected at one end to the other extremity of said floating lever, a live lever to which is pivotally connected at one extremity the other end of said compression member, a third brake beam pivotally connected to said live lever between the extremities thereof, and means for actuating the other extremity of said live lever from the brake mechanism of the car body.

3. The combination with a six wheel truck and its inside hung brake beams, of a lever pivotally connected to the center beam, which lever is pivotally mounted on a fixed part of the truck, floating levers pivotally connected to the outside beams, a compression member connecting corresponding extremities of the floating levers, a compression member connecting the first mentioned lever with one of the floating levers, and means connected to the other one of the floating levers for actuating the same and the parts coöperating therewith.

In testimony whereof I hereunto affix my signature in the presence of two witnesses, this 23rd day of March, 1914.

CHARLES T. WESTLAKE.

Witnesses:
  HAL C. BELLVILLE,
  B. E. KEEHL.